United States Patent [19]

Harris

[11] 3,722,065
[45] Mar. 27, 1973

[54] APPARATUS FOR POSITIONING METERING DEVICES

[75] Inventor: Joseph Warren Harris, Vernal, Utah
[73] Assignee: C. R. Industries, Vernal, Utah
[22] Filed: Dec. 2, 1971
[21] Appl. No.: 204,050

[52] U.S. Cl. ................................................29/237
[51] Int. Cl. .............................................B23p 19/04
[58] Field of Search........29/237, 238, 244, 256, 282; 254/29 R; 248/70

[56] References Cited

UNITED STATES PATENTS

| | | | |
|---|---|---|---|
| 1,674,330 | 6/1928 | Hyler | 29/238 |
| 2,958,125 | 11/1960 | Nichols | 29/237 |
| 3,414,961 | 12/1968 | Bjalme | 29/237 |
| 3,426,417 | 2/1969 | Austin | 29/237 |

Primary Examiner—Robert C. Riordon
Assistant Examiner—J. C. Peters
Attorney—Kay S. Cornaby et al.

[57] ABSTRACT

An apparatus for positioning a metering device to facilitate the attachment of the metering device to feed lines located within a shaft has a generally U-shaped frame having a neck and two arms adapted to rest upon the horizontal portions of the feed lines. The apparatus has means interconnecting the two arms for varying the distance between the arms and has support means disposed between the arms and attached to the frame to support a metering device on the frame. An elongate member, preferably longitudinally extendable, is disposed at the neck of the frame for supporting the frame against the shaft walls in a predetermined position. In use, a metering device can be placed on the support means between the frame arms so that the input connection of the device can be positioned with respect to the feed line connections. The means interconnecting the frame arms is used to diminish the distance between the frame arms and thereby force the feed line connections against the threaded metering device connections for convenient attachment.

10 Claims, 4 Drawing Figures

INVENTOR.
JOSEPH WARREN HARRIS

ATTORNEYS

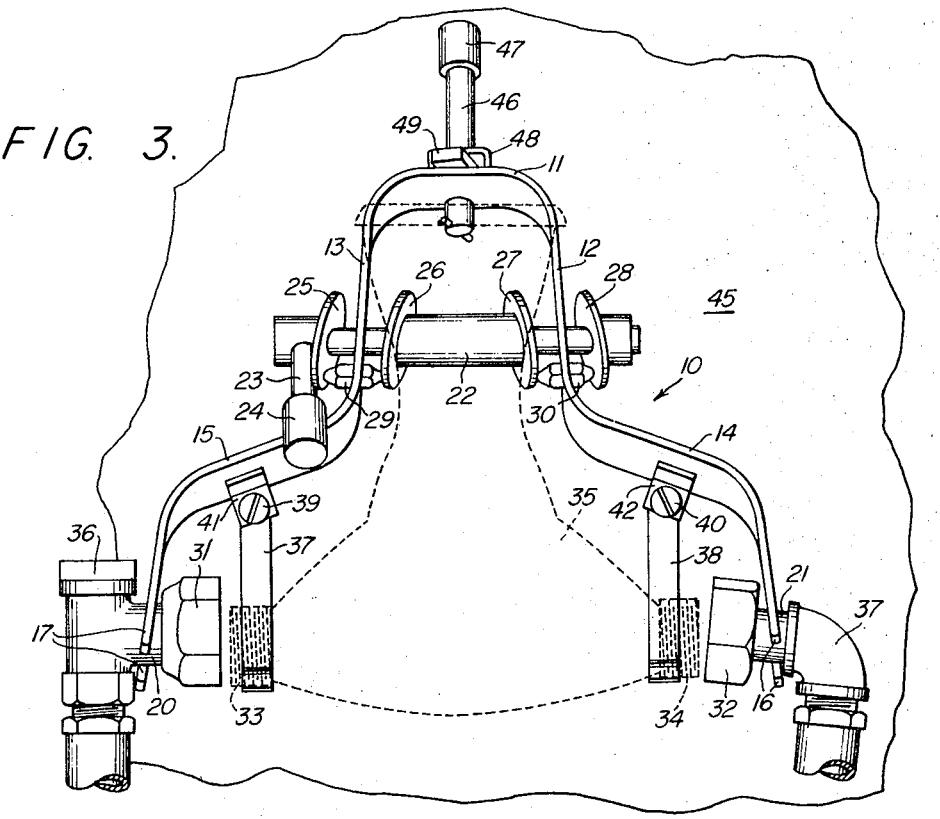
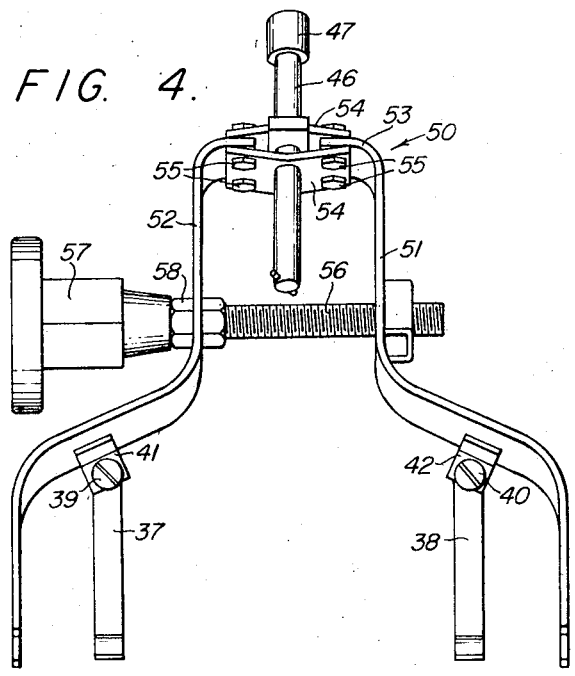

APPARATUS FOR POSITIONING METERING DEVICES

BACKGROUND OF THE INVENTION

1. Field

This invention relates to means for positioning metering devices for attachment to feed lines.

2. State of the Art

Metering devices for measuring the flow rate of fluids through underground lines are often located in narrow vertical shafts leading to the underground lines. Water meters for example, are customarily placed in vertical shafts of about 2 feet diameter through which the incoming feed line is routed to connect with the meter below the frost line, thus making access to the meter for purposes of replacement or new installation difficult and time-consuming. Typically, the incoming water line extends upwardly from the underground line through the narrow shaft and then horizontally a short distance toward the center of the shaft, terminating in a threaded nut connection. The outflow water line is set up in a similar manner on the opposite wall of the shaft. Water meters have a threaded connection on each opposite side for attachment to the corresponding incoming and outflowing lines, so that all water flowing through the line is measured by the metering device.

Heretofore, it has been extremely difficult to hold such water meters in place between the connecting means of the incoming and outflowing lines while the appropriate connections were being made to the meter. There are no devices commercially available for holding water meters or other such metering devices in proper position to enable an installer to utilize both hands in making the necessary connections in a shaft.

OBJECTIVES

It was an objective in the development of this invention to provide an apparatus for positioning a metering device in a shaft and holding the device in position while the necessary connections to the feed lines are made.

SUMMARY OF THE INVENTION

In accordance with the invention, an apparatus for positioning and holding a metering device stationary with respect to feed lines has a generally U-shaped frame. In a preferred embodiment, the frame arms extend downwardly from the neck of the frame a predetermined distance and curve outwardly a short distance and then curve downwardly again. In such a configuration, the frame has a narrower dimension between the two arms near the neck thereof than at the open ends of the arms. The ends of the arms preferably have notches therein to facilitate disposing the ends of the arms about lateral portions of feed lines.

Means are provided for interconnecting the arms, preferably near the neck of the frame for applying simultaneous pressure to both arms in opposite directions, so that the arms may be either flexed outwardly or inwardly to vary the distance between the arm ends and, hence, the distance between the ends of the feed lines to accommodate a metering device. Support means is attached to the lower portion of the frame for supporting a metering device, so that the device will be in position adjacent the feed line ends when the apparatus is resting on the lateral portions of the feed lines. In a preferred embodiment, the means comprises two metal strips attached to the frame and extending downwardly, parallel to and along the inner surfaces of the respective arms. The ends of each strip are slightly curved forwardly to form a small shelf upon which the metering device can rest. Preferably the support means is laterally adjustable to provide for precise positioning of the metering device with respect to the feed line ends. An elongate member is disposed at the neck of the frame for positioning the apparatus by resting the outer end of the elongate member against the wall of the narrow shaft. The elongate member is preferably slideably mounted in the frame neck to permit extension of the member a desired distance above the frame for more precise positioning of the apparatus. Means is also preferably provided for locking the member in a predetermined position with respect to the neck.

THE DRAWINGS

The best mode presently contemplated of carrying out the invention is illustrated in the accompanying drawings, in which:

FIG. 1 is a perspective view of the apparatus showing the outwardly extending arms of the frame;

FIG. 2, a front elevation of the apparatus showing the frame arms contracted to force the ends of the feed lines against the metering device connections;

FIG. 3, a front elevation of the same apparatus with the arms in an expanded position, thereby drawing the feed lines laterally away from the metering device connections; and FIG. 4, a front elevation of an alternative embodiment employing a threaded bolt as the interconnecting means between the arms and having a two-piece frame joined together at the neck.

DETAILED DESCRIPTION OF THE ILLUSTRATED EMBODIMENT

Figure 1:
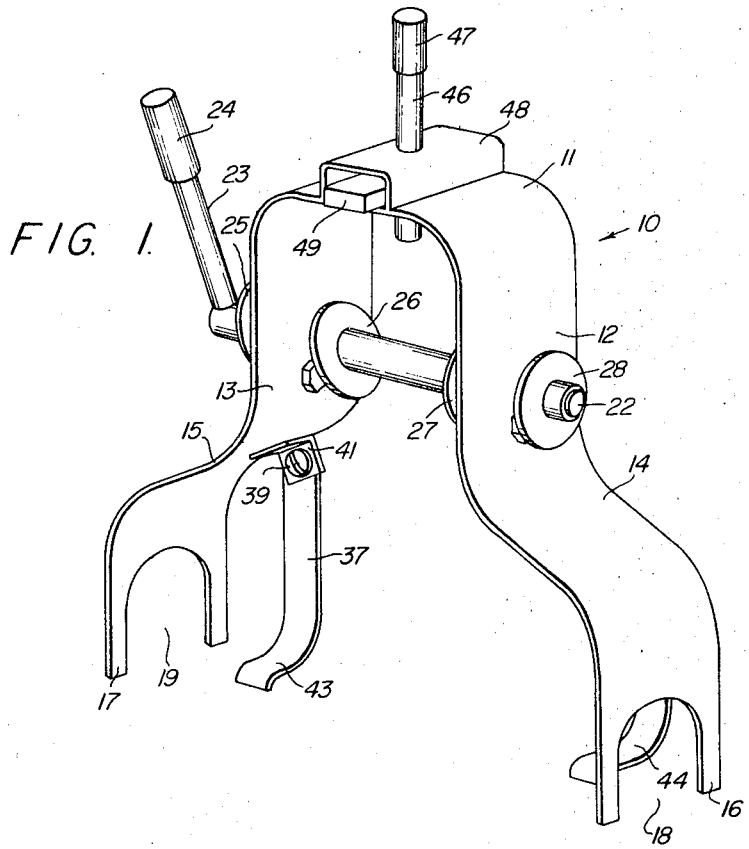

As illustrated in FIG. 1, a preferred embodiment of the meter positioning apparatus has a generally U-shaped frame 10 constructed of tempered, wide-ribbon steel having a neck 11 and two arms 12, 13 depending respectively downwardly from either side of the neck. Each arm 12, 13 has an outwardly and downwardly extending bend 14, 15 approximately midlength of the arm, thereby providing increased distance between the arms at the outer ends 16, 17 thereof than in the upper portion. Arm ends 16, 17 preferably have respective notches 18, 19 therein to aid in positioning the apparatus on the horizontal portions of inflow feed line 20 and outflow feed line 21, shown in FIGS. 2 and 3. The notches are adapted to fit around and rest upon the corresponding feed lines.

Figure 2:
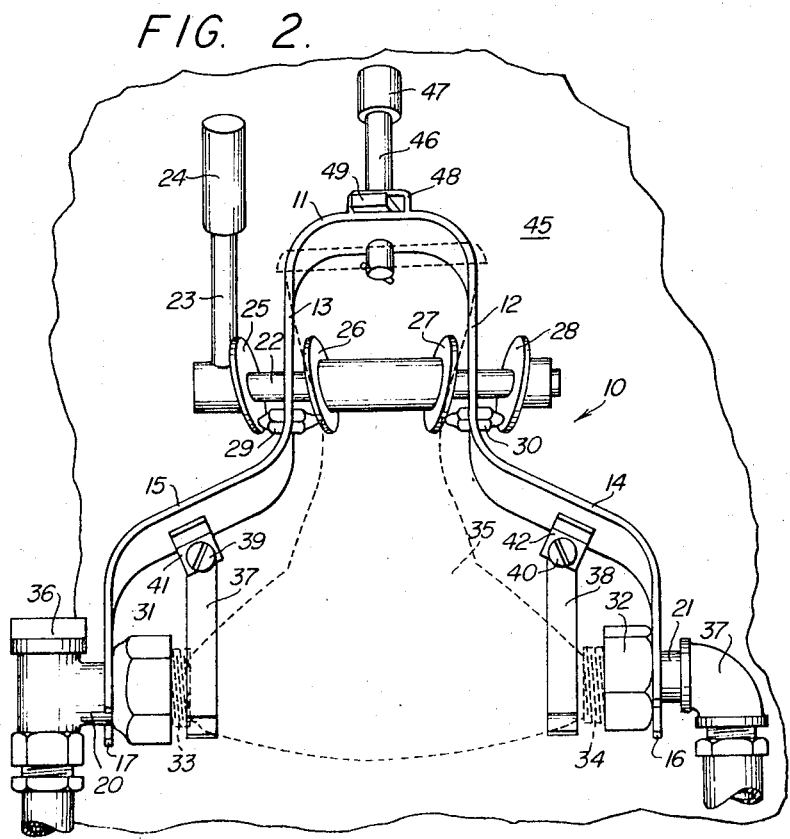

The connecting means between arms 12 and 13 in the embodiment shown in FIGS. 1–3 includes an elongate rod 22 which extends through cooperating apertures in arms 12, 13. Rod 22 has a levered handle 23 with a rubber grip 24 on the end thereof for rotating the rod.

Two pairs of discs 25, 26 and 27, 28 are secured coaxially on rod 22 with the two discs of disc pair 25, 26 being disposed respectively on opposite sides of arm 13, and the two discs of disc pair 27, 28 being disposed respectively on opposite sides of arm 12. Both pairs of discs are canted with respect to rod 22 so that when lever 23 is in the raised position, as shown in FIG. 2, the lower edges of the discs are canted inwardly toward the center of the frame to enable outer discs 25, 28 to exert pressure inwardly on corresponding knobs 29, 30 attached respectively to the outer surfaces of arms 12, 13. Such pressure on the knobs flexes arms 12, 13 inwardly to decrease the distance between the arms. When the apparatus is in operation with notches 18, 19 in position adjacent the feed line nuts 31 and 32, the contraction of arms 12, 13 engages the edges of the nuts and forces the feed lines inwardly to meet the threaded connections 33 and 34 on a metering apparatus 35, shown in proper position in outline at FIGS. 2 and 3.

As shown in FIG. 3, when lever 23 is in the lowered position, thereby rotating rod 22 and discs 25, 26, 27 and 28, the lower edges of all discs are canted outwardly from the center of the frame to enable inner discs 26, 27 to exert pressure outwardly on the arms, thereby expanding the distance between the arms. The edges of arm notches 18, 19 are in contact with inflow line cut-off valve 36 and the right-angle bend 37 in feed line 21, respectively, so that when pressure is applied, the two feed lines are forced apart, permitting easier separation of metering device 35 from the feed lines.

The support means in the illustrated embodiment for holding metering device 35 on frame 10 comprises a pair of downwardly extending, elongate bands 37 and 38 adjustably secured by means of two screws 39 and 40 to a pair of flanges 41, 42 attached to the inner surfaces of frame arms 12, 13. Bands 37, 38 each have a slight forward curve 43, 44 at the outer ends thereof to provide a relatively small shelf upon which the metering device can be placed. The bands can be adjusted with respect to the distance between the bands and arm notches 18, 19 to enable the metering device to be placed in perfect alignment with the feed lines for convenient, rapid connection. Other supporting means for the metering device can be employed, such as a wire mesh or net, or the like.

The elongate member for supporting the apparatus in a predetermined position against the wall 45 of a shaft comprises in this embodiment a rod 46 having a rubber knob 47 on the outer end thereof and being slidably mounted in an aperture in neck 11 of frame 10. Means for securing rod 46 in a predetermined position can be employed. For example, as shown in FIG. 1, a U-shaped brack 48, having an aperture through which rod 46 passes, can be mounted on the frame neck. A rectangular block 49 having an aperture (not shown) somewhat larger than the circumference of rod 46 is moveably mounted within brace 48 so that the block is freely slidable about the rod which passes through the block's aperture. With the rod extended to a predetermined length, the forward edge of block 49 can be lifted to engage the upper edge of brace 48, thereby securing the circumference of the brace aperture against rod 46 and binding the rod in its extended position. The apparatus may be leaned rearwardly to enable rubber knob 47 to rest against the shaft wall 45, which permits metering device 35 to be cradled against the pair of bands 37, 38 and the upper portion of the frame arms, as shown in FIGS. 2 and 3.

An alternative embodiment for heavier gauge feed lines or larger metering devices is depicted in FIG. 4. In this embodiment, the frame 50 comprises two individual frame arms 51, 52 joined together at the frame neck 53 by means of a double plate 54 which is secured by four bolts 55 to provide additional strength at the point of stress on the neck. Double plate 54 also functions as a supporting rod brace, similar in function to brace 48 described hereinbefore in connection with the embodiment as shown in FIGS. 1–3.

The alternative embodiment also has a threaded bolt 56 as the connecting means between arms 51, 52. Bolt 56 has a knob 57 and is rotatably mounted between the arms by means of threaded nuts 58 secured to the arms. Bolt 56 is adapted to be rotated in clockwise direction to contract the arms; and to be rotated counter-clockwise direction to expand the arms.

Although the preferred material for constructing the apparatus is spring steel, any other suitable material, such as high strength plastic, or the like, can be employed. The construction material of the apparatus will depend in part on the resiliency of the feed line pipe encountered, e.g., galvanized iron or copper, and the weight and size of the metering device.

Whereas this invention is illustrated and described herein with respect to certain preferred forms, it is to be understood that many variations are possible without departing from the inventive concepts particularly pointed out in the claims.

I claim:

1. Apparatus for positioning a metering device in a shaft with respect to horizontal ends of feed lines having coupling means attached thereto, comprising in combination:

a generally U-shaped frame comprising a neck and two arms;

connecting means between the two frame arms for providing flexing of the arms to vary the distance between the arms;

support means disposed between the frame arms adapted to support a metering device to permit the attachment of the device to the feed line coupling means; and an elongate member attached to the neck of the frame and adapted to rest against a side of the shaft to maintain the frame at a predetermined position with respect to the feed lines.

2. Apparatus as set forth in claim 1, wherein the arms of the frame are so constructed that the distance between the arms near the neck of the frame is less than the corresponding distance near the ends of the arms.

3. Apparatus as set forth in claim 1, wherein the connecting means between the frame arms comprises an elongate rod extending through respective apertures in each arm, said rod having a lever attached at one end thereof and having means disposed along the rod for alternately applying pressure to both inner surfaces of the arms and to both outer surfaces of the arms.

4. Apparatus as set forth in claim 1, wherein the connecting means between the frame arms comprises a threaded bolt extending through apertures in the frame arms and through corresponding nuts respectively attached to each arm, including means for rotating the bolt.

5. Apparatus as set forth in claim 1, wherein the support means is movably mounted on the frame arms to provide for adjustment of the support means with respect to the arms.

6. Apparatus as set forth in claim 1, wherein the support means comprises a pair of elongate members depending respectively from the frame arms and extending parallel along the arms with the outer ends of said members being slightly forwardly curved thereby forming a support for a metering device.

7. Apparatus as set forth in claim 1, wherein the elongate member attached to the frame is slidably mounted with respect to the neck to provide for adjustment of the member above the neck.

8. Apparatus as set forth in claim 7, wherein the elongate member comprises a rod slidably mounted through an aperture in the frame neck and including means for holding the rod in a fixed relationship with the neck.

9. Apparatus as set forth in claim 1, wherein the ends of the frame arms have notches therein.

10. Apparatus as set forth in claim 1, wherein the frame is constructed of metal.

* * * * *